(12) United States Patent
Chang

(10) Patent No.: US 7,530,066 B2
(45) Date of Patent: May 5, 2009

(54) CONTROLLING SNOOP ACTIVITIES USING TASK TABLE IN MULTIPROCESSOR SYSTEM

(76) Inventor: Stephen S. Chang, 528 E. Myrtle, Glendora, CA (US) 91740

( * ) Notice: Subject to any disclaimer, the term of this patent is extended or adjusted under 35 U.S.C. 154(b) by 839 days.

(21) Appl. No.: 10/179,790

(22) Filed: Jun. 24, 2002

(65) Prior Publication Data
US 2004/0015969 A1 Jan. 22, 2004

(51) Int. Cl.
*G06F 9/46* (2006.01)
*G06F 13/00* (2006.01)
*G06F 13/24* (2006.01)

(52) U.S. Cl. .............. 718/100; 710/100; 710/260; 711/141; 711/146

(58) Field of Classification Search ......... 711/117–118, 711/141, 146; 718/100–108; 710/100, 260
See application file for complete search history.

(56) References Cited

U.S. PATENT DOCUMENTS

| | | | | |
|---|---|---|---|---|
| 5,025,365 A | * | 6/1991 | Mathur et al. | 711/121 |
| 5,559,987 A | * | 9/1996 | Foley et al. | 711/144 |
| 5,581,713 A | * | 12/1996 | Myers et al. | 710/119 |
| 5,911,052 A | * | 6/1999 | Singhal et al. | 710/113 |
| 5,923,898 A | * | 7/1999 | Genduso et al. | 710/6 |
| 6,029,204 A | * | 2/2000 | Arimilli et al. | 709/248 |
| 6,073,212 A | * | 6/2000 | Hayes et al. | 711/122 |
| 6,098,156 A | * | 8/2000 | Lenk | 711/146 |
| 6,105,113 A | * | 8/2000 | Schimmel | 711/146 |
| 6,389,516 B1 | * | 5/2002 | Nunez et al. | 711/146 |
| 6,460,100 B1 | * | 10/2002 | Arimilli et al. | 710/105 |
| 6,460,119 B1 | * | 10/2002 | Bachand et al. | 711/146 |
| 6,662,216 B1 | * | 12/2003 | Arimilli et al. | 709/218 |
| 6,823,431 B2 | * | 11/2004 | Freerksen et al. | 711/146 |
| 7,028,299 B1 | * | 4/2006 | Chang | 718/104 |
| 7,114,038 B2 | * | 9/2006 | Orenstien et al. | 711/146 |
| 7,143,412 B2 | * | 11/2006 | Koenen | 718/102 |
| 7,162,590 B2 | * | 1/2007 | Pruvost et al. | 711/147 |
| 2002/0138698 A1 | * | 9/2002 | Kalla | 711/130 |
| 2003/0046495 A1 | * | 3/2003 | Venkitakrishnan et al. | 711/141 |
| 2003/0097394 A1 | * | 5/2003 | Chauvel et al. | 709/100 |
| 2003/0120877 A1 | * | 6/2003 | Jahnke | 711/150 |

* cited by examiner

*Primary Examiner*—Lewis A Bullock, Jr.
*Assistant Examiner*—Jennifer N To
(74) *Attorney, Agent, or Firm*—Blakely, Sokoloff, Taylor & Zafman LLP

(57) ABSTRACT

An embodiment of the present invention includes a task table to store a task entry corresponding to a first task associated with a first processor. A snoop controller controls snooping an access reference to a cache line in a task block in response to a second task cycle generated by a second processor according to a snoop condition.

40 Claims, 9 Drawing Sheets

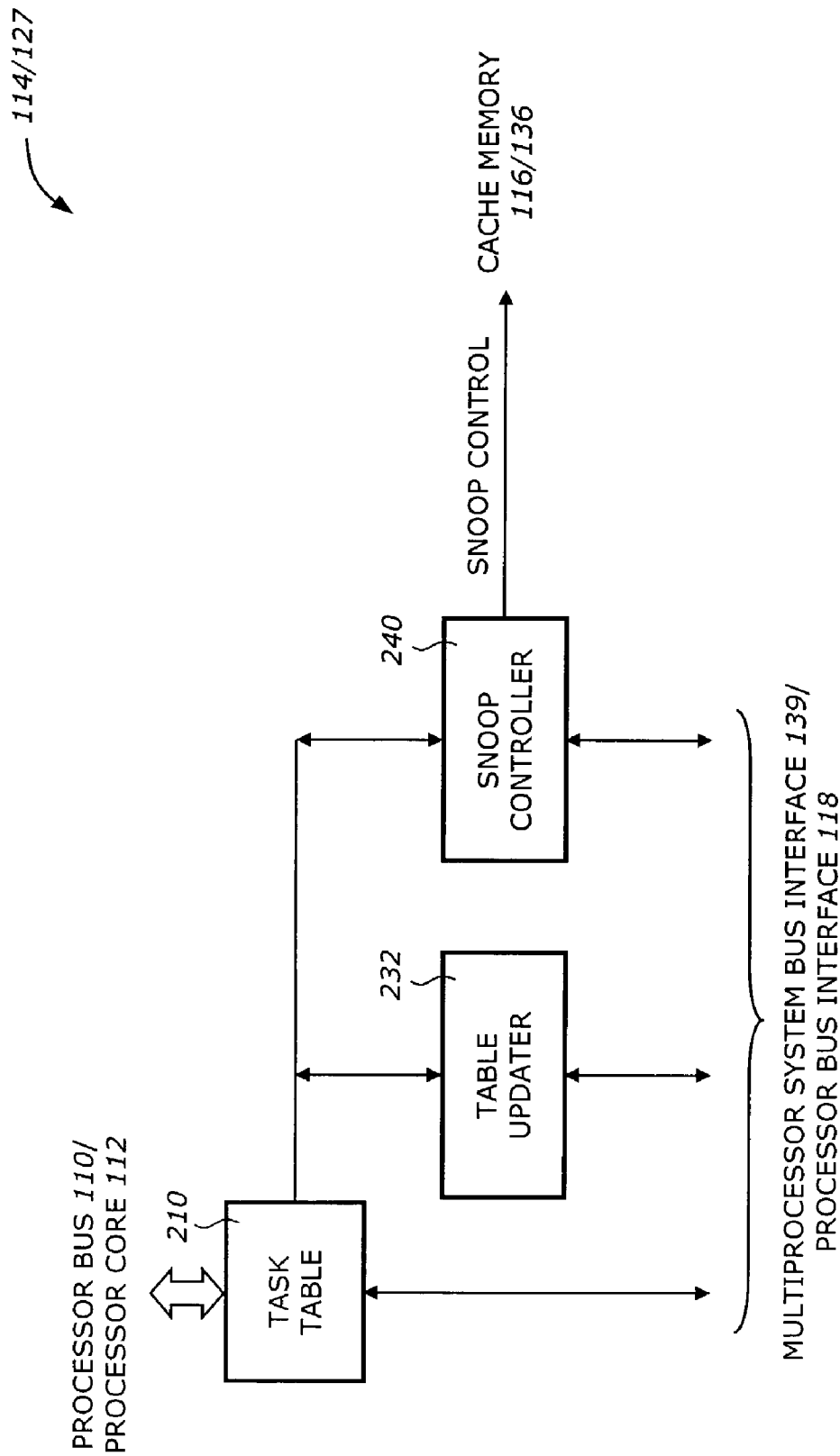

| | STATUS | TASK ID | START ADDRESS | TASK BLOCK SIZE |
|---|---|---|---|---|
| $410_1$ | INVALID | X | X | X |
| $410_2$ | VALID | 00100 | 0100 0000 | 0000 1000 |
| ... | ... | ... | ... | ... |
| $410_L$ | VALID | 00080 | 0040 0000 | 0000 0100 |

FIG. 4

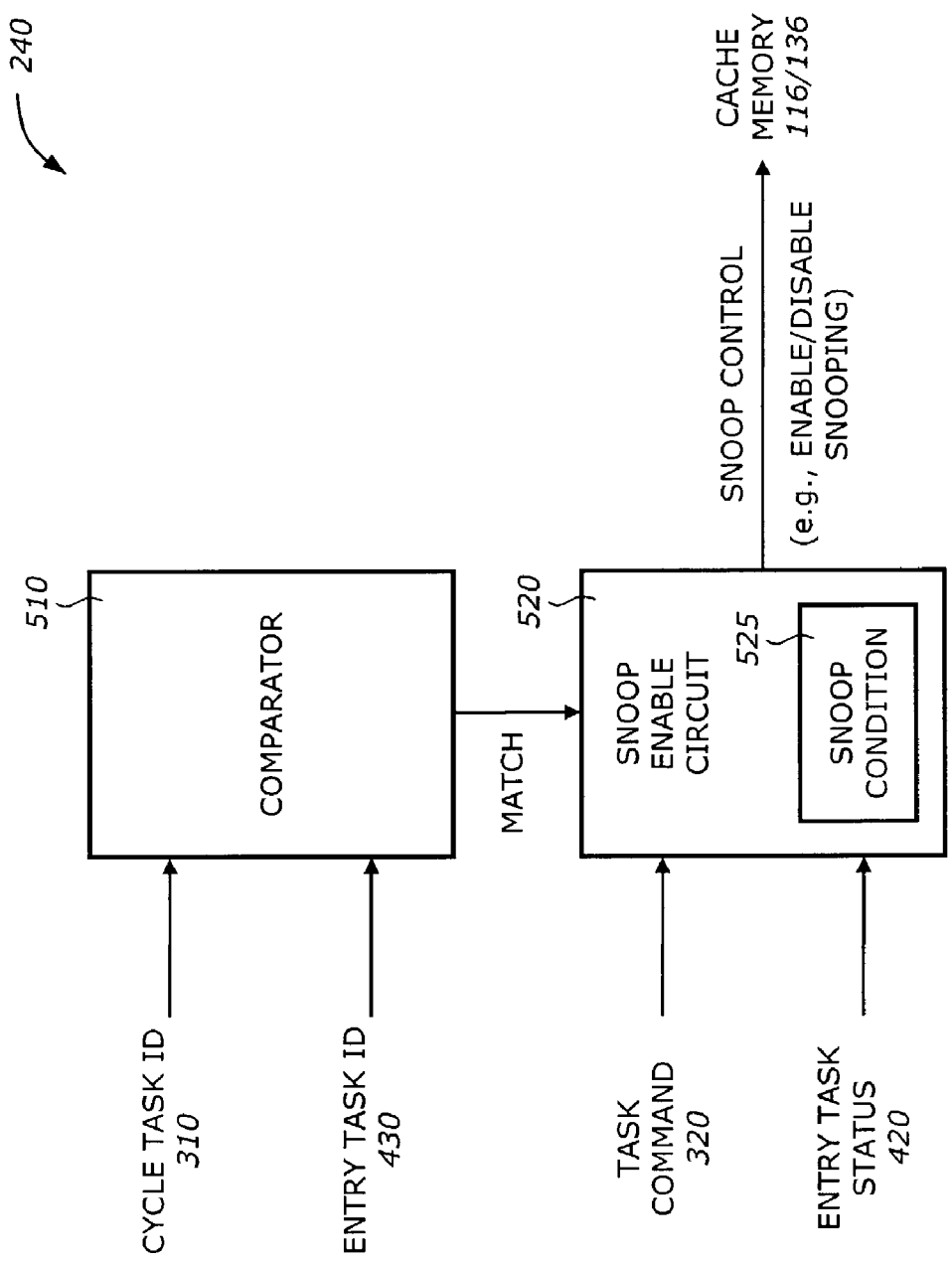

CONTROLLING SNOOP ACTIVITIES USING TASK TABLE IN MULTIPROCESSOR SYSTEM

BACKGROUND

1. Field

Embodiments of the invention relate to the field of microprocessors, and more specifically, to multiprocessor systems.

2. Background

A typical multiprocessor system has a number of processors running in parallel. By decomposing a large problem into smaller tasks and allowing these tasks to be executed by concurrent processors, a significant speed improvement is achieved. There are, however, many challenges facing multiprocessor design. Examples of these challenges include cache coherency, snooping protocol, task allocation, communication, and parallel compilers.

Current processors or microprocessors, having internal cache memories typically contains a tag memory that records the addresses of the cache lines accessed by the processor. The tags in the tag memory are compared against the address of a processor internal request. A match or a hit to a tag entry usually means the requesting data is contained in the processor cache. The data can be supplied directly from the cache instead of issuing an external cycle to fetch the data from the main memory. The tags are also compared to a cacheable cycle from another processor seen on the multiprocessor bus. A match to a tag entry requires the processor to take appropriate actions and signal the requesting processor of the ownership of the cache line. The monitoring of the multiprocessor bus by a processor is refer as "snooping". The interactions between the requesting processor and snooping processor to ensure data consistency on the cache line is called "cache coherency" as is well known. These interactions typically take up processor cycles. In addition, all cacheable agents have to complete the snoop activities before the cacheable cycle can complete. The snoop activities are often delayed because of slow tag timing or conflicts with on-going internal tag accesses.

BRIEF DESCRIPTION OF THE DRAWINGS

The invention may best be understood by referring to the following description and accompanying drawings that are used to illustrate embodiments of the invention. In the drawings:

FIG. 2A is a diagram illustrating a task manager according to one embodiment of the invention.

FIG. 4 is a diagram illustrating a task table shown in FIG. 2A according to one embodiment of the invention.

FIG. 5 is a diagram illustrating a snoop controller shown in FIG. 2A according to one embodiment of the invention.

DESCRIPTION

An embodiment of the present invention includes a task table to store task entries corresponding to the tasks blocks cached in a first processor. A snoop controller controls the snoop activities associated with access reference to a cache line in one of the task blocks in the task table in response to a second task cycle generated by a second processor according to a snoop condition.

In the following description, numerous specific details are set forth. However, it is understood that embodiments of the invention may be practiced without these specific details. In other instances, well-known circuits, structures, and techniques have not been shown in order not to obscure the understanding of this description.

In a multiprocessor system, the operating system distributes tasks to different processors to maximize parallelism. Tasks are partitioned program routines that can be executed in parallel. They are managed by the operating system through a table called "task table". The task table contains status or states of active tasks. The state information is used by the operating system to determine the scheduling and resource sharing of tasks. One embodiment of the invention is a multiprocessor system architecture that performs transactions and maintains cache coherency on task basis instead of on cache line basis. The architecture provides a task table in the processor to enable snooping only on the cache lines in the tasks cached in a processor. It also changes the bus protocol to handle task-based transactions.

A task is a partitioned program routine that can be viewed as an instruction block with or without a data block. In the following, the term "data block" refers to both data and instruction blocks. A task may be partitioned into an instruction block and a data block. A block or task is the basic unit for task transactions and task table. Each block may includes contiguous cache lines or a set of cache lines required by the task. A "task cycle" is a newly defined system bus cycle. A task cycle starts with a header identifying a task ID, requests, and other related attributes. It is followed by a set of cache lines accesses required by the task, and terminates with a task terminator. As the tasks are distributed and acquired by different processors, the processor records the tasks ID in the task table. The cache line addresses are recorded in the tag like a typical cache architecture. The processors can snoop a task cycle on the bus, and check to see if it is recorded in the task table. If a task cycle "hits" the task table, then the processor can enable the snooping of the cache lines for the "hit" task. Since the processor only snoops on the task header and cache lines for the "hit task" instead of every cache lines on the system bus, the snoop activities are greatly reduced.

Figure 1:
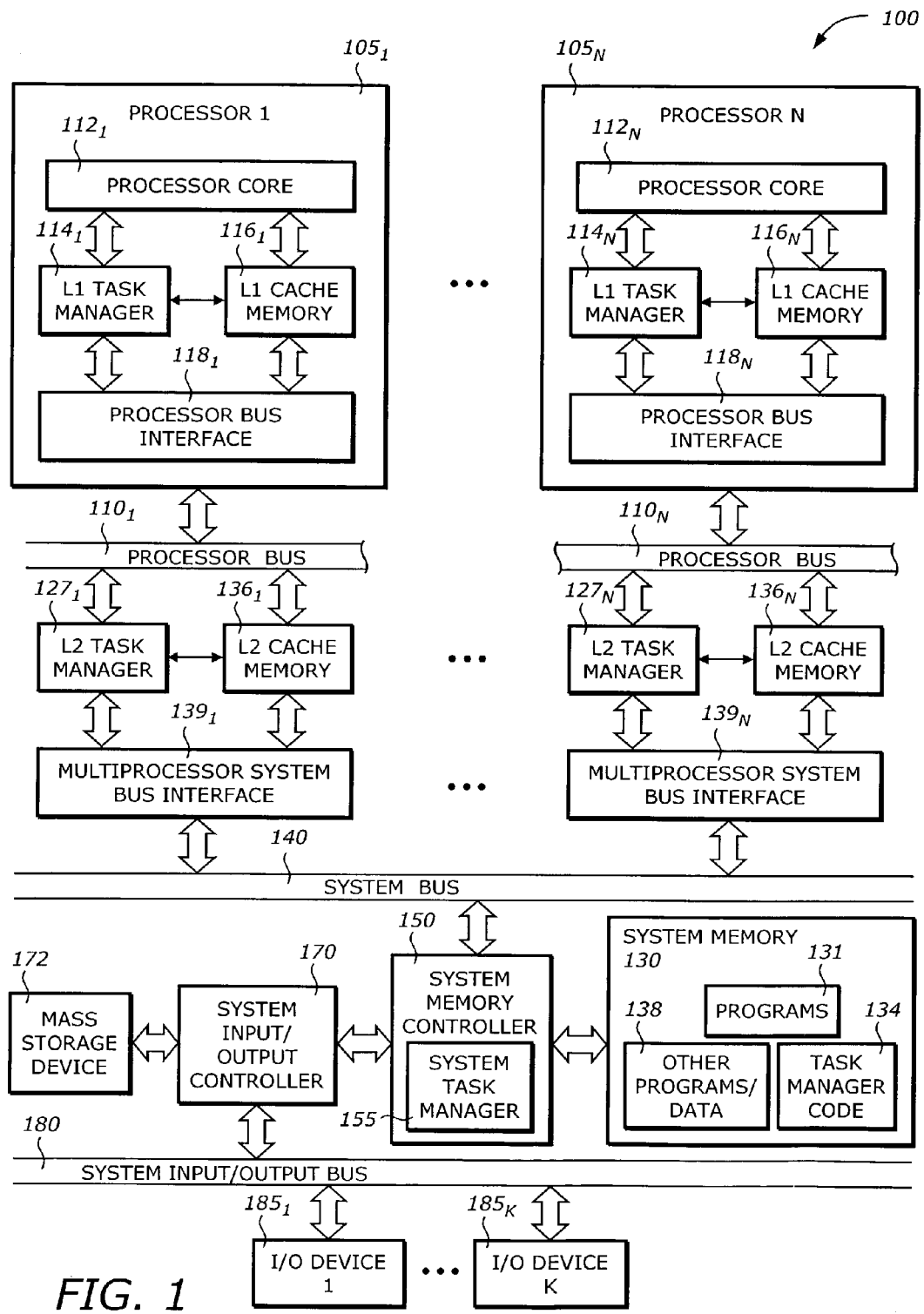
FIG. 1 is a diagram illustrating a system in which one embodiment of the invention can be practiced.

FIG. 1 is a diagram illustrating a computer system 100 according to one embodiment of the present invention. The computer system 100 includes N processors $105_1$ to $105_N$, N processor buses $110_1$ to $110_N$ corresponding to the N processors $105_1$ to $105_N$, respectively, N task managers $127_1$ to $127_N$, N cache memories $136_1$ to $136_N$, N multiprocessor system bus interfaces $139_1$ to $139_N$, a system bus 140, a system memory controller 150, a main memory 130, a system input/output (I/O) controller 170, a mass storage device 172, a system input/output bus 180, and K I/O devices $185_1$ to $185_K$.

Each of the processors $105_1$ to $105_N$ represents a central processor of any type of architecture, such as embedded processors, mobile processors, microcontrollers, digital signal processors, superscalar computers, vector processors, single instruction multiple data (SIMD) computers, complex instruction set computers (CISC), reduced instruction set computers (RISC), very long instruction word (VLIW), or hybrid architecture. The processors $105_1$ to $105_N$ may have the same or different architectures but they all support the task-based processing protocol. For illustrative purposes, only the processor $105_1$ is described and the subscripts may be dropped for clarity. The processor $105_1$ includes a processor core 112, a task manager 114, a cache memory 116, and a processor bus interface 118. The processor core 112 includes the core circuitry of the processor such as an instruction decoder, arithmetic and logic unit, instruction issuing unit, etc. The task manager 114 may be referred to as internal task manager or level 1 (L1) task manager. It manages the tasks executed by the processor $105_1$. The cache memory 116 may contain program and data, and data blocks used by the task manager 114. The cache memory 116 is also referred to as the internal cache or level 1 (L1) cache. The processor $105_1$, the task manager 114, and the cache memory 116 interface with the processor bus 110 via the processor bus interface 118.

The processor bus 110 allows the processor 105 to access the task manager 127 and the cache memory 136. There are also other normal activities on the processor bus 110. The task manager 127 may be referred to as L2 task manager. It manages the tasks in conjunction with the L2 cache memory 136. The cache memory 136 is also referred to as the external cache or level 2 (L2) cache with respect to the processor 105. The multiprocessor system bus interface 139 allows the task manager 127, the cache memory 136, and the processor 105 to access to the system bus 140. It is noted that the L1 task manager is optional. It is used if the processor 105 is architected to handle task based transactions. A conventional processor can still perform cache line base transactions without L1 task manager 114. The L2 task managers 127 is required and should be maintained by the hardware and the processor.

The system bus 140 is a multiprocessor bus to allow N processors $105_1$ to $105_N$ to access the main memory 130 and to perform other bus-related activities such as broadcasting cycles, decoding cycles, snooping, etc. The system memory controller 150 controls the use of the main memory 130 and has an interface to the system I/O controller 170. The system memory controller 150 may additionally contain a task manager 155. The task manager 155 is optional and may be used for a multiple multiprocessor systems. The task manager 155 is essentially similar to the task managers 114 and 127. The task table associated with the task manager 155 may be located inside the task manager 155 or outside the system memory controller 150. The main memory 130 represents one or more mechanisms for storing information. For example, the main memory 130 may include non-volatile or volatile memories. Examples of these memories include flash memory, read only memory (ROM), or random access memory (RAM). The system main memory 130 may contain a task manager code 134 to support the task manager 114, and/or 127, and/or 155, a program 131 and other programs and data 138. Of course, the main memory 130 preferably contains additional software (not shown), which is not necessary to understanding the invention.

The system I/O controller 170 provides interface to I/O devices and the system I/O bus 180. The mass storage devices 172 include compact disk (CD) ROM, floppy diskettes, and hard drives. The system I/O bus 180 provides high-speed I/O accesses. An example of the system I/O bus 180 is the Peripheral Component Interconnect (PCI) bus. The I/O device $185_1$ to $185_K$ are peripheral devices performing dedicated tasks. Examples of the I/O devices include direct memory access controller (DMAC), input/output processors (IOP), network interface and media interface devices. The network interface connects to communication networks such as the Internet. The Internet provides access to on-line service providers, Web browsers, and other network channels. The media interface provides access to audio and video devices.

The task managers 114, 127 and 155 may be implemented by hardware, firmware, software or any combination thereof. When implemented in software, the elements of an embodiment of the present invention are essentially the code segments to perform the necessary tasks. The software may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information such as the mass storage devices 172. Examples of the processor readable medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The term "data" here refers to any type of information that is encoded for machine-readable purposes. Therefore, it may include program, code, data, file, etc. The machine accessible medium may include data that, when accessed by a machine, cause the machine to perform the operation described in the following.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

FIG. 2A is a diagram illustrating the task manager 114 or 127 shown in FIG. 1 according to one embodiment of the invention. The task manager 114 includes a task table 210, a task updater 232, and a snoop controller 240.

The internal (L1) task manager 114 and external (L2) task manager 127 are essentially similar. The main difference is the interface circuitry to the bus and the memory. The task table 210 stores task entries corresponding to tasks executed by at least one of the processors $105_1$ to $105_N$. The task table 210 provides a means to keep track of the tasks obtained or executed by the processors 105 to $105_N$. As will be described later, each task entry has an entry task identifier (ID) that uniquely identifies a task. The task table 210 may be implemented as a fully associative memory.

The task table updater 232 is responsible for updating the task table 210 when new tasks are acquired. The updating includes writing information about a task entry to the task table 210. The task table updater 232 also updates the entry task status by marking the status to another status according to a task management protocol as will be described later.

The snoop controller 240 generates a snoop control signal to control snooping access references to a cache line in a task block of the cache memory 116 or 136 in response to a task cycle generated by a processor according to a snoop condition. Depending on the type of task cycle and the current entry task status, the snoop controller 240 may enable or disable cache line basis snooping. A requesting processor drives a task cycle on the system bus to fetch a task. The task ID is used to compared to other processor's task tables. A match or a hit to the task table of a processor means that processor is currently processing the same task and it enables the snooping for the subsequent cache lines accesses associated with the task. The processor is required to respond to each cache line in the task with the proper cache coherency protocol. A miss to the task tables means the processor does not need to pay attention to the task since none of the cache lines in the task were fetched by the processor. Since snooping is disabled for task cycles that miss the task table, this saves a significant time spent on snooping. The basic idea is to frame a group of memory requests associated with a task, with the start and termination, and check only the cache lines framed within the task cycle against the processors handling the same task. In essence, the task table provides a means to filter snoop activities and reduce snoop activities to provide high system response time.

Figure 2B:
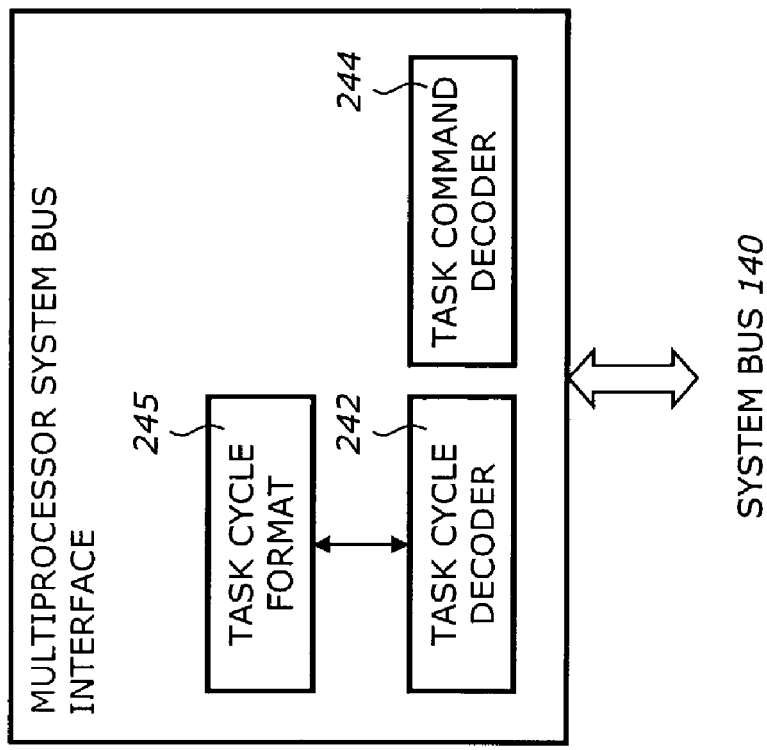
FIG. 2B is a diagram illustrating a multiprocessor system bus interface according to one embodiment of the invention.

FIG. 2B is a diagram illustrating the multiprocessor system bus interface 139 shown in FIG. 1 according to one embodiment of the invention.

The multiprocessor system bus interface 139 provides interface to the system bus 140. The processor interface 240 includes a task cycle decoder 242 and a task command decoder 244. The task cycle decoder 242 decodes cycle signals generated by the processor core 112 or broadcast or directs to a specific processor on the system bus 140 when a cycle is initiated. A processor cycle may be task related or non-task related. A non-task related cycle is treated like a conventional bus cycle and is handled in the normal processing sequence (for example performing cache coherency protocol on every cache line). A task related cycle contain task information according to a task cycle format 245. The task command decoder 244 decodes the task command in the task cycle and provides appropriate action according to the decoded command.

The main memory may also contain a task table that tracks all the tasks acquired by the processors. The main memory task table allows the elimination of snoop phase and simplifies the bus protocol to only request and data phases. In addition, the table also acts as snoop filter in a multi system bus design. Since cache coherency is done by communicating with task cycles, it is important to maintain consistency of the association of the cache lines to a task throughout the system until the task is invalidated. Single cache line cycles are still allowed in the system. It, however, requires snooping on every cycle and is much less efficient than a block size accesses. It should be limited to semaphore or mailbox operations.

A task cycle is divided into three phases: task start, memory access phase, and task termination. The task start signals the processors or cached agents on the system bus the start of a task cycle. This is followed by a series of memory requests. The memory request has the same format as the conventional multiprocessor bus protocol, which typically consists of a request phase, a snoop phase, a response phase, and a data phase. After the last memory request is issued, the task termination is driven to inform the processors/cache agents of the end of the task cycle.

Figure 3:
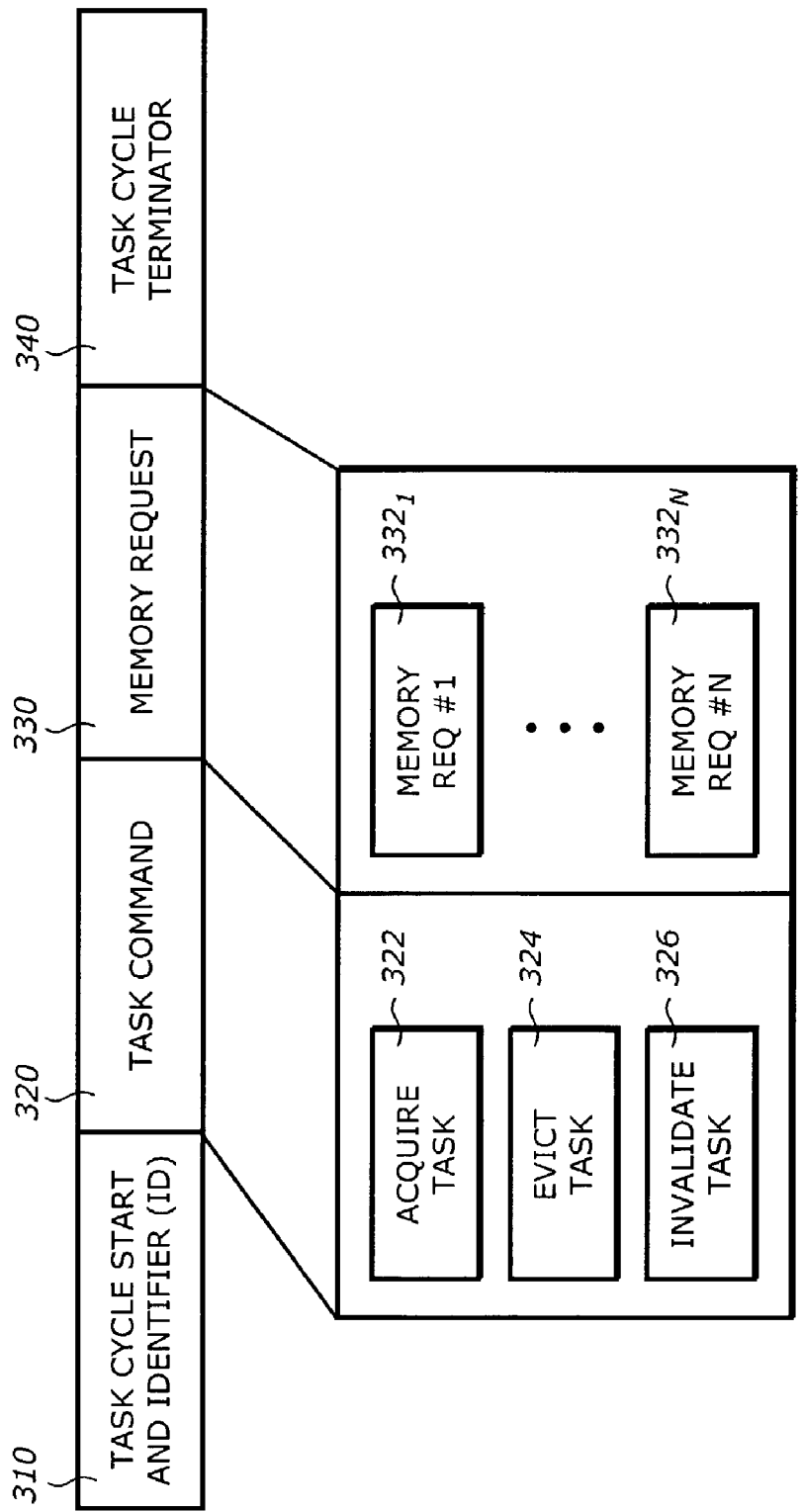
FIG. 3 is a diagram illustrating a task cycle format shown in FIG. 2B according to one embodiment of the invention.

FIG. 3 is a diagram illustrating the task cycle format 245 shown in FIG. 2B according to one embodiment of the invention. The task cycle format 245 includes a task cycle start and identifier (ID) 310, a task command 320, a memory request 330 associated with the task, and a task cycle terminator 340. A task block size may also be included if necessary.

The task cycle start and ID 310 is used to indicate the start of a task cycle and identifies or names a task in a unique manner within a processing session. Each different task whether executed by the same processor or different processors has a different task ID. Similarly, a task may be executed by a processor or different processors but has only one unique ID. The task command 320 specifies the type of operation to be operated on a task. There may be several types of operations. In one embodiment, the task command 320 includes an acquire_task command 322, a evict_task command 324 and an invalidate_task command 326. The acquire_task command 322 is used to acquire a task. It may contain read_shared and/or read_exclusive memory requests to acquire the data associated with the task. The evict_task command 324 is used to evict a task from a processor. It may contain memory write requests to write back all modified data associated with the task during eviction. The invalidate_task command 326 is used to invalidate a task. When a task is invalidated, if it contains modified data, the processor writes back all the modified cache lines in the task to the main memory, and invalidates the task after the modified cache lines have been transferred to the main memory. When a task is invalidated, its task ID can be re-used. All task cycles are required to enclose all cache line addresses contained in the task. The association of the cache lines to a task is kept consistent across the system.

The memory request 330 specifies the read or write requests $332_1$ to $332_N$ of the data associated with the task. Each request is issued in the same manner as the conventional memory request. For example, a memory request would contain the request type (e.g., read, read_invalidate, write), the snoop response (e.g., shared, exclusive, modified), response (no_data, normal_data), and the data.

The task terminator 340 signals the end of the snooping. Upon encounting the tank terminator 340, the processor looks for the next task header to compare to its task table.

FIG. 4 is a diagram illustrating the task table 210 shown in FIG. 2A according to one embodiment of the invention. The task table 210 includes L task entries $410_1$ to $410_L$ organized into an entry task status 420, an entry task ID 430, a start address 440, a task block size 450. This implementation enforces block data structure where all task cycles access blocks of consecutive addresses, such that the addresses in a task can be tracked by the start address and the block size. This allows the elimination of the conventional tag memory which tracks individual cache lines. Different implementation may choose flexibility of grouping non-consecutive addresses together for a task. In this case, a conventional tag memory may be required to track individual address associated with the task. There are many schemes to implement the task table and address tracking (e.g. link list, indirect mapping, etc.). For this application we will describe the block data structure approach as an illustration.

Each of the task entries $410_1$ to $410_L$ contains information about a task. The entry task status 420 indicates the status of a task. The entry task status 420 may be valid or invalid. A valid status indicates the entry in the task table contains valid information and its associated task is stored in the processor cache. An invalid status indicates that the entry in the task table is unused and its fields are invalid. The entry task ID 430 contains the task ID of the task, e.g., task ID 310. This task ID is unique to the task in the active session in which tasks are running. The start address 440 contains the start address of the data block associated with the task. The task block size 450 contains the task block size.

In the illustrative example shown in FIG. 4, the task entry 410₁ has an invalid status. The entry task ID, start address, task block size are is don't cares and may contain any value. The task entry 410₂ corresponds to entry task ID 00100 with a valid status. The start address and the task block size of the task ID 00100 are 0100 000, 0000 1000 respectively. Similarly, the entries 410_L corresponds to entry task ID 00080 having an valid status. The start address and the task block size of the task ID 00080 are 0040 000 and 0000 0100 respectively. The valid entries in the task table are used to compare to the task ID seen on the system bus. When a match occurs, the processor is required to turn on snooping for the subsequent memory requests in the task cycle. Appropriate snoop response and cache coherency protocol are issued for these memory requests. Notice the processor may optionally choose to track the memory request addresses from the start address and block size fields in the task table.

The following describes the use of task cycles in a system. This section is described without the restriction of the task cycle and task table format stated above. As is known by one of ordinary skill in the art, this discussion can be combined with the above format. The task table 210 is typically large enough to hold a sufficient number of task entries. When the number of task entries exceeds the task table size, old task entries are evicted to make room for new task entries. The cache lines associated with the evicted task are invalidated. The eviction, or replacement, of the old task entries in the task table may be performed using a number of techniques. Examples of these techniques include a first-in-first-out replacement, least recently used replacement, or any other techniques used in tag replacement. The task table may also contain the task sub-states for scheduling purpose. The task may be in the state of ready, sleep, active, or terminated. Ready state indicates the task is ready to be executed. Sleep state indicates the task is temporally suspended until an event to wake it up. Active state means the processor is executing the task. Ready, sleep and active states belong to the valid task status as described above. Terminated state means the task was terminated and is equivalent to an invalid status. The task states are updated by the processor/operating system as it acquires, executes, suspends, or terminates tasks. Different algorithms can be developed to divide the processor resources to the tasks in different states.

Tasks in the system can be managed in several different ways. The operating system may give a task to a specific processor, or by asking a free processor to grab a task. The processor that is handling the task distribution may issue a task cycle that is directed to a specific processor. The targeted processor receives the task unconditionally. By contrast, a task may be broadcasted. In this case, all processors participate in acquiring the task. Different criteria determine who will get the task. For example, each processor may contain a priority register. A task cycle is attached with a priority. The processors whose priority register values are less than the task priority are excluded from participating task acquisition. Another determining factor is the availability of free resources in the processor. Free resource may include memory space and processor availability, which affects how quickly it can respond to the task. The first responding processor, which has the largest amount of free resources, wins the task.

When a new task cycle is broadcast on the system bus, the first processor who determines that it can accept the task issues a task cycle in response. Upon detection of the task cycle, the other processors cancel their attempts to acquire the same task. If no processor has sufficient resource, a timer that is inverse proportional to the amount of free resource in an agent counts down. When the timer expires, the agent issues a task cycle to acquire the task. In this way the agent that has the largest amount of resource will win the task. Sometimes, the agent will have to evict tasks to make room for the new task. A task may contain too large a block of data that is difficult and inefficient to handle. In this case, a large task may be divided into smaller manageable tasks by the operating system. A task cycle may be either loading a task or executing a task. The loading of task asks the processor to load a task into its cache or local memory. The processor is responsible to prioritize the loaded tasks and execute them. The task cycle can also be execution of a task. When the task cycle is issued, the processor/processors that contain the task are forced to execute it immediately. If no processor has the task loaded, then the processor is required to load the task and execute it.

When a new task is acquired, the new task information from the task start is loaded to the L2 task tables. The processor keeps the task schedule in its task table. For example, a task tracked in the task table may have states of busy, sleep, ready, or terminated. The processor is responsible to prioritize the tasks execution. The addresses for the memory requests are also recorded in the L2 tag memory when the data is transferred either from the main memory or from a snooping agent responding to the task cycle. Depending on the processor design, the processor may begin executing the task before the entire data transfer completes. Once the data is in the cache RAMs, the processor can index to the L1 cache with its program or data counters as it begins to process the task. The processor may receive another request via a broadcast cycle on the multiprocessor bus for a task already in its cache. In this case, it can respond to the request immediately by issuing a task acknowledge response. Upon observing the task acknowledge response, the processors stop participating in acquiring the task. Other times, requests of cached tasks may come from the task the processor is executing; then no external task cycle is generated. Since the system functions are based on tasks and the data blocks, the code associated with the task is most efficiently handled with relative addressing method and branching within the data block. Single cache line access is allowed in the system. This is done in the request phase of a bus cycle by the explicit indication of single cache line access. In general, a single cache line cycle does not access the data block region. However, single cache line accesses within a task data block is still allowed provided that the data is always kept consistent between the single cache line cache and data block cache. For single cache lines, a small size cache RAM and tag RAM are used in the processor to track them. Due to the small size tag RAM, single cache line accesses should be avoided as much as possible, preferably restricted to mailbox communications.

FIG. 5 is a diagram illustrating the snoop controller 240 shown in FIG. 2A according to one embodiment of the invention. The snoop controller 240 includes a comparator 510 and a snoop enable circuit 520.

The comparator 510 compares the cycle task ID 310 and the entry task ID 430 in the task table 210. The comparator 510 may be optional when the task table 210 is implemented by a fully associative memory because the matching, search, or comparison logic can be implemented inside the task table 210. The comparator 510 generates a match signal to the snoop enable circuit 520 to indicate if there is a match between the cycle task ID 310 and an entry task ID 430 in the task table 210.

The snoop enable circuit 520 generates the snoop control signal to the cache memory 116 or 136 to enable snooping the access reference when the entry task ID 430 matches the cycle task ID 310 and a snoop condition 525 is asserted. The snoop condition 525 is determined based on the task memory requests seen on the system bus 320 (FIG. 1) and the L2 cache state of the same cache lines 420 (FIG. 4).

The operation of the snoop filtering involves determining the snoop condition and updating the status of the L2 entries associated with the task 210. The relevant task cycles include Acquire_Task, Evict_Task, Invalidate_Task, and Flush_Task.

Figure 6A:
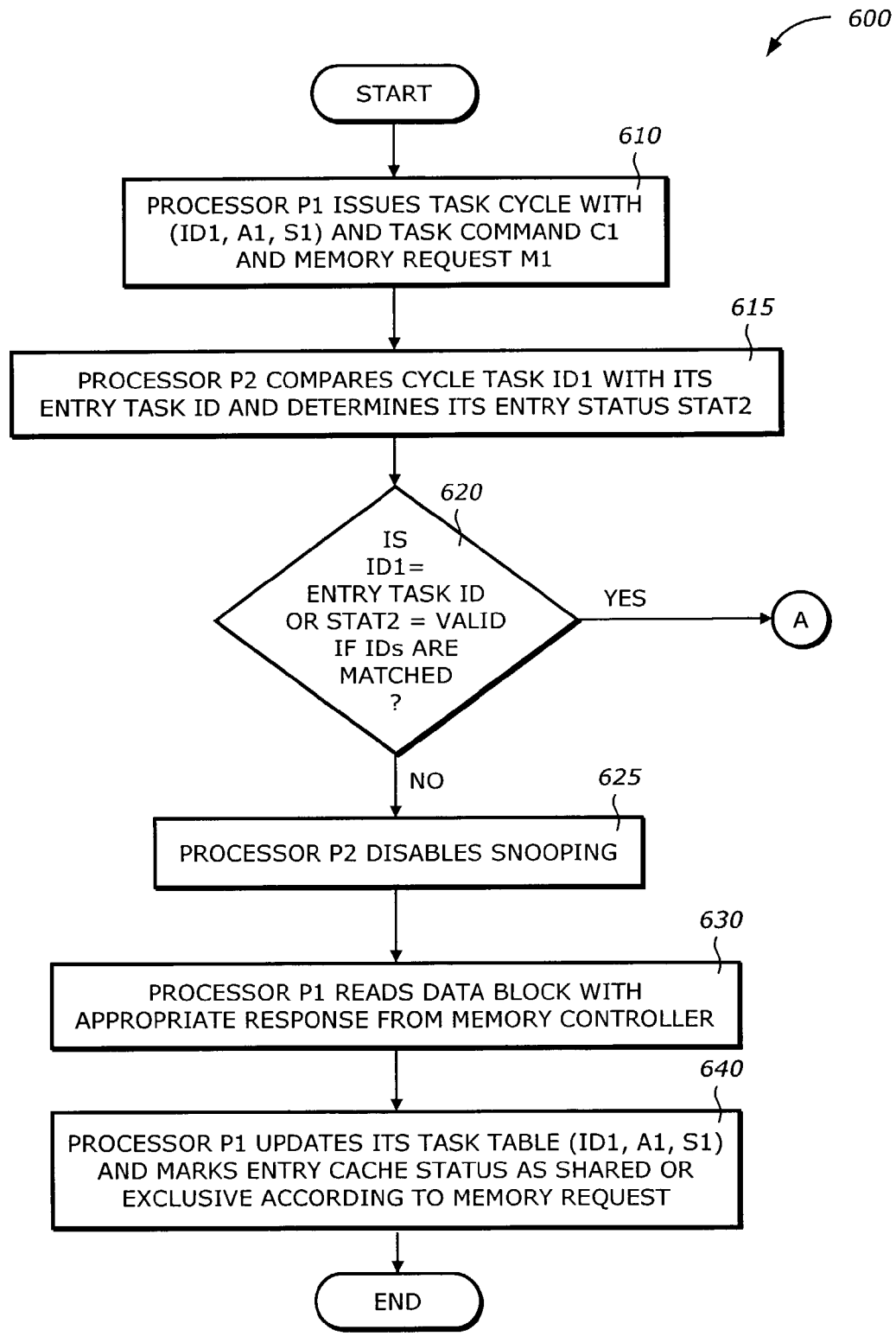
FIG. 6A is a flowchart illustrating a first part of a process to control snooping in response to a Read task cycle according to one embodiment of the invention.

FIG. 6A is a flowchart illustrating a first part of a process 600 to control snooping in response to a Acquire task cycle according to one embodiment of the invention. In the following flowcharts, the discussion is limited to a processor P1 and a processor P2 operating on the multiprocessor bus. As is known by one of ordinary skill in the art, the description is applicable to any number of processors.

Upon START, processor P1 issues a task cycle of a task T1 with a cycle task ID ID1, a starting address A1, a task block size S1, and a task command C1 and a memory request M1 (Block 610). The memory request M1 may be a Read_Shared or a Read_Exclusive request. The task cycle is broadcast on the multiprocessor system bus. All processors connected to the bus decode the task cycle. For brevity, in the following discussion, only a processor P2 is described. Processor P2 compares the cycle task ID1 with its entry task ID and determines the corresponding entry status Stat2 associated with the task ID1 if such task ID1 exists in its task table (Block 615).

The processor P2 determines whether the cycle task ID1 matches the entry task ID in one of its entries in the task table, and if there is a match, whether the entry status Stat2 is valid (Block 620). If not, the process 600 goes to connector A shown in FIG. 6B. Otherwise, processor P2 disables snooping the access references to the cache lines in the data block of task T1 (Block 625) an Next, processor P1 reads the data block via series of memory requests with the appropriate response from the memory controller (Block 630). The snoop response may be a Shared response, an Exclusive response, or a Modified response depending on the memory requests and the snoop response. Then, processor P1 updates its task table (ID1, A1, S1) as appropriate and marks the L2 tag entry cache status for each memory access as Shared, Exclusive, or Modified according to the snoop response. If the memory request is Read_Shared, processor P1 marks the L2 entry status Shared. If the memory request is Read_Exclusive, processor P1 marks the L2 entry status Exclusive and so on. The process 600 is then terminated.

Figure 6B:
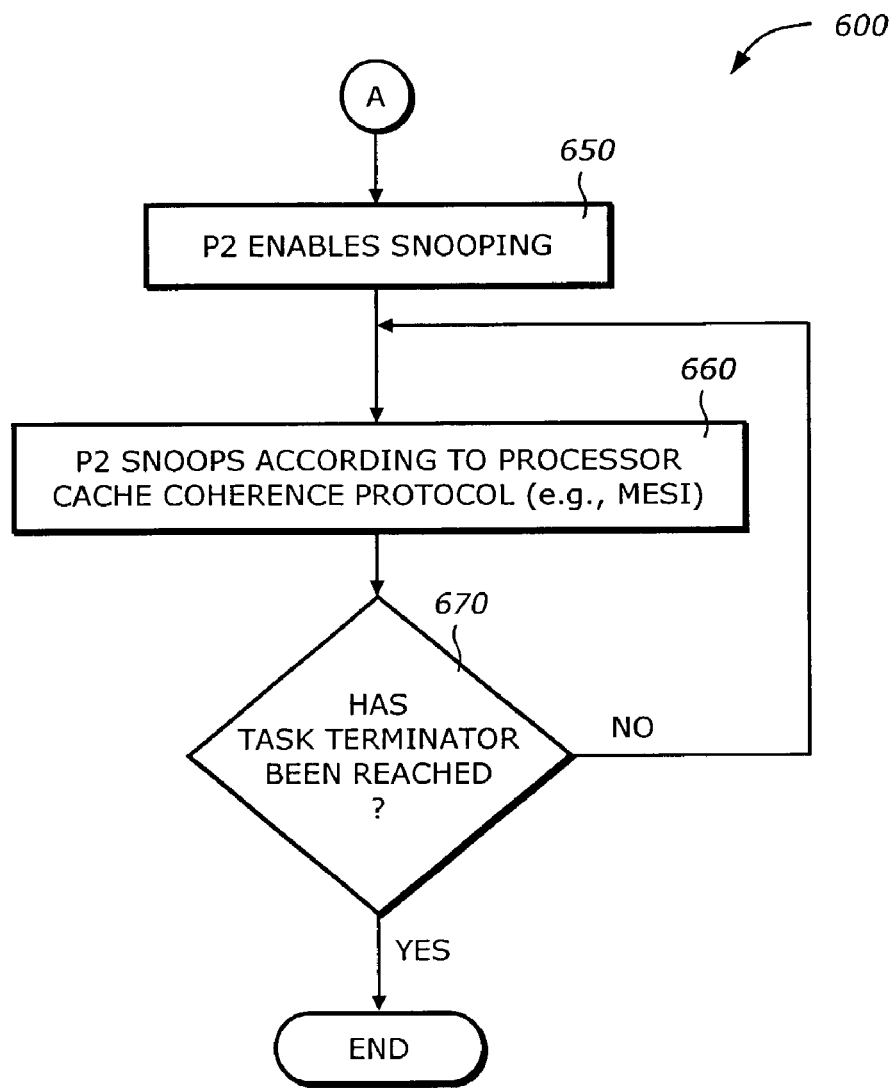
FIG. 6B is a flowchart illustrating a second part of the process shown in FIG. 6A according to one embodiment of the invention.

FIG. 6B is a flowchart illustrating a second part of the process 600 shown in FIG. 6A according to one embodiment of the invention.

Continuing from connector A, processor P2 enables snooping (Block 650). Next, processor P2 responds to the snoop condition based on the memory request M1 and its L2 entry cache status according to the processor cache coherence protocol (e.g., MESI) (Block 640). The memory request M1 is either Read_Shared or Exclusive, Invalidate or Write_back, or Write. The entry cache status is also either Invalid, Shared, Exclusive or Modified. When snooping is enabled, the snooping is virtually identical to the conventional architecture. Each memory access seen on system bus is compared to the L2 cache tags. There will always be hit the L2 cache because the cache lines have been made associated with a task consistent across the system. Each memory access is responded according to the L2 cache state and the memory request M1. For example, if the memory request M1 is read_shared, and the snooping processor L2 cache has a shared copy, the snoop response would be "shared". Similarly, if the memory request M1 is read_exclusive, and the L2 cache is shared, then the snooping processor is required to invalidate the L2 cache entry for that cache line. These are all conventional MESI protocol. It is then determined if the task terminator has been reached (Block 670). If not, the process 600 returns to block 660 to continue responding to the memory requests. Otherwise, the process 600 is terminated.

Figure 7:
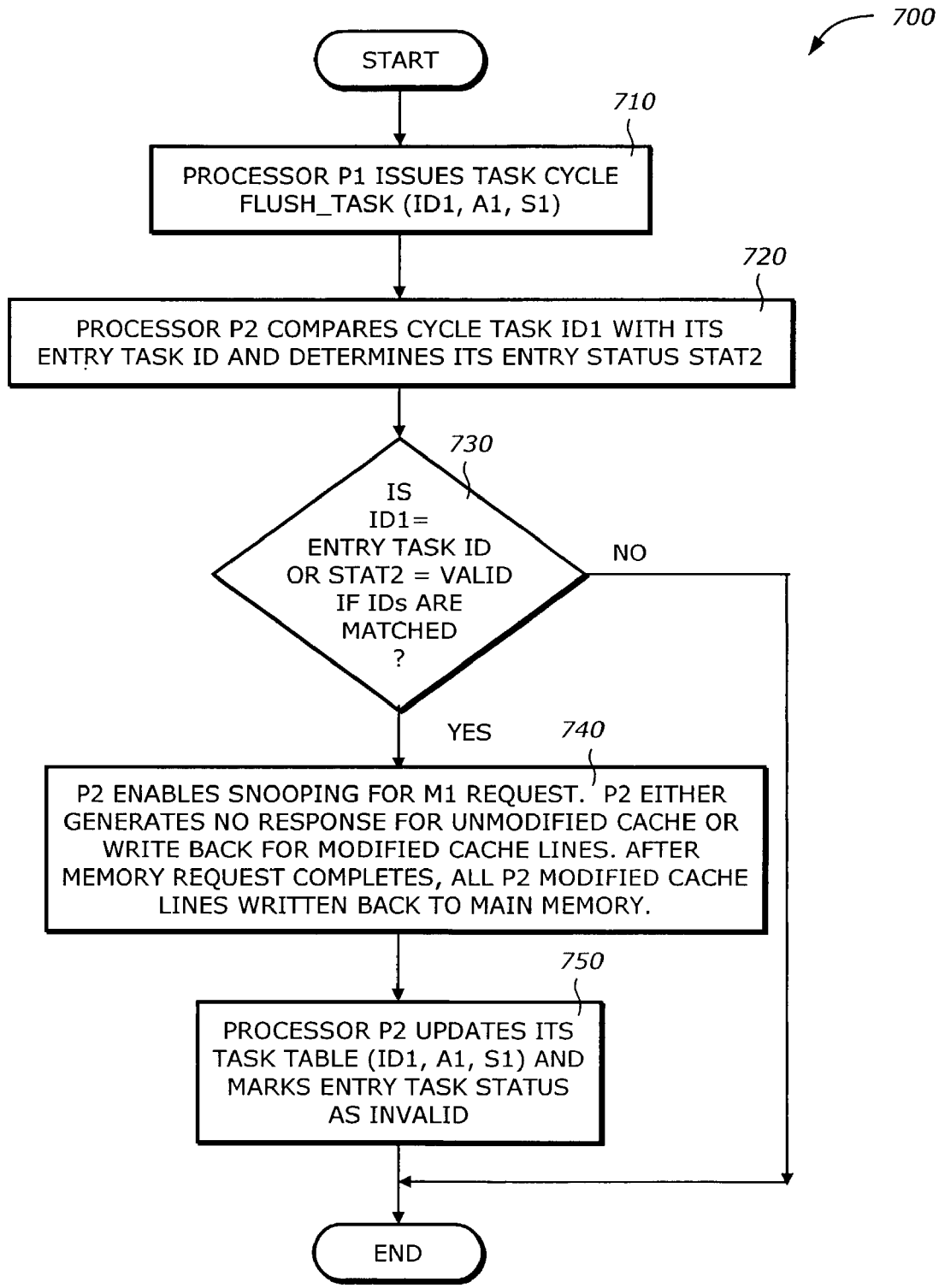
FIG. 7 is a flowchart illustrating a process to respond to a Flush Task cycle according to one embodiment of the invention.

FIG. 7 is a flowchart illustrating a process 700 to respond to a Flush_Task cycle according to one embodiment of the invention.

Upon START, processor P1 issues a task cycle Flush_Task for task T1 with a cycle task ID ID1, a starting address A1, a task block size S1, a memory request M1, and a task command C1 (Block 710). Next, processor P2 compares the cycle task ID1 with its entry task ID and determines the corresponding entry status Stat2 associated with the task ID1 if such task ID1 exists in its task table (Block 720).

Then, processor P2 determines whether the cycle task ID1 matches the entry task ID in one of its entries in the task table, and if there is a match, whether the entry status Stat2 is valid (Block 730). If so, processor P2 enables the snooping for the M1 requests (Block 740). When snooping is enabled, the snooping is virtually identical to the conventional architecture. Each memory access seen on system bus is compared to the L2 cache tags. There will always be hit the L2 cache because the cache lines have been made associated with a task consistent across the system. Each memory access is responded according to the L2 cache state and the memory request M1. In this case, the memory request M1 is always an Invalidate request. In response to an Invalidate request, P2 either generates no response for unmodified cache line or write back response for modified cache lines. When the memory requests M1 completes, all P2 modified cache lines associated with Task T1 are written back to the main memory. Next, processor P2 updates its task table (ID1, A1, S1) and marks the corresponding entry task status Invalid (Block 750) and the process 700 is terminated. If there is no ID match or there is a match but the entry task status is Invalid, the process 700 is terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus having a first processor comprising:
   a task table to store a task entry corresponding to a first task associated with the first processor, the first task being a partitioned program routine having at least an instruction block; and
   a snoop controller coupled to the task table to control snooping an access reference to a cache line in a task block in response to a second task cycle generated by a second processor according to a snoop condition, the second task cycle including a set of cache line accesses required by a second task.

2. The apparatus of claim 1 further comprising:
   a table updater coupled to the task table to update the task entry based on a first task cycle generated by the first processor, the first task cycle including a set of cache line accesses required by the first task.

3. The apparatus of claim 2 wherein the task entry includes at least one of an entry task status, an entry task identifier (ID), an entry task address, an entry task block size, and an entry task terminator.

4. The apparatus of claim 3 wherein one of the first and second task cycles provides at least one of a cycle task ID, a task command, a memory request, a cycle task terminator, and a cycle task block size.

5. The apparatus of claim 4 wherein the task command includes at least one of an acquire task command, an evict task command, and an invalidate task command.

6. The apparatus of claim 5 wherein the entry task status is one of invalid and valid.

7. The apparatus of claim 6 wherein the snoop controller comprises:
a comparator to match the entry task ID and the cycle task ID; and
a snoop enable circuit to enable snooping the access reference when the entry task ID matches the cycle task ID and the entry task status is valid.

8. The apparatus of claim 7 wherein the first processor responds to a memory request according to a cache coherence protocol when snooping is enabled.

9. The apparatus of claim 7 wherein the snoop enable circuit disables snooping the access reference when a snooping disable condition occurs.

10. The apparatus of claim 9 wherein the snooping disable condition occurs when the entry table ID does not match the cycle task ID when the entry task status is invalid or when the task cycle terminator is reached.

11. A method comprising:
storing a task entry corresponding to a first task associated with a first processor in a task table, the first task being a partitioned program routine having at least an instruction block; and
controlling snooping an access reference to a cache line in a task block in response to a second task cycle generated by a second processor according to a snoop condition, the second task cycle including a set of cache line lines accesses required by a second task.

12. The method of claim 11 further comprising:
updating the task entry based on a first task cycle generated by the first processor, the first task cycle including a set of cache line accesses required by the first task.

13. The method of claim 12 wherein storing the task entry comprises storing at least one of an entry task status, an entry task identifier (ID), an entry task address, an entry task block size, and an entry task terminator.

14. The method of claim 13 further comprising providing at least one of a cycle task ID, a task command, a cycle task terminator, a memory request, and a cycle task block size in one of the first and second task cycles.

15. The method of claim 14 wherein providing the task command comprises providing at least one of an acquire task command, an evict task command, and an invalidate task command.

16. The method of claim 15 wherein storing the entry task status comprises storing the entry task status being one of invalid and valid.

17. The method of claim 16 wherein controlling snooping comprises:
matching the entry task ID and the cycle task ID; and
enabling snooping the access reference when the entry task ID matches the cycle task ID and the entry task status is valid.

18. The method of claim 17 further comprising responding to a memory request according to a cache coherence protocol when snooping is enabled.

19. The method of claim 17 wherein controlling snooping further comprises:
generating a snooping disable condition; and
disabling snooping the access reference when the snooping disable condition occurs.

20. The method of claim 19 wherein generating the snooping disable condition comprises:
generating the snooping disable condition when the entry table ID does not match the cycle task ID, when the entry task status is invalid, or when the task cycle terminator is reached.

21. An article of manufacture comprising:
a machine-accessible storage medium including data stored thereon that, when accessed by a machine, causes the machine to:
store a task entry corresponding to a first task associated with a first processor in a task table, the first task being a partitioned program routine having at least an instruction block; and
control snooping an access reference to a cache line in a task block in response to a second task cycle generated by a second processor according to a snoop condition, the second task cycle including a set of cache line accesses required by a second task.

22. The article of manufacture of claim 21 further comprising data that, when accessed, causes the machine to:
update the task entry based on a first task cycle generated by the first processor, the first task cycle including a set of cache line accesses required by the first task.

23. The article of manufacture of claim 22 wherein the data causing the machine to store the task entry comprises data that causes the machine to store at least one of an entry task status, an entry task identifier (ID), an entry task address, an entry task block size, and an entry task terminator.

24. The article of manufacture of claim 23 wherein the machine-accessible medium further comprises data, when accessed, causes the machine to provide at least one of a cycle task ID, a task command, a cycle task terminator, a memory request, and a cycle task block size in one of the first and second task cycles.

25. The article of manufacture of claim 24 wherein the data causing the machine to provide the task command comprises data that causes the machine to provide at least one of an acquire task command, an evict task command, and an invalidate task command.

26. The article of manufacture of claim 25 wherein the data causing the machine to store the entry task status comprises data that causes the machine to store the entry task status being one of invalid and valid.

27. The article of manufacture of claim 26 wherein the data causing the machine to control snooping comprises data that causes the machine to:
match the entry task ID and the cycle task ID; and
enable snooping the access reference when the entry task ID matches the cycle task ID and the entry task status is valid.

28. The article of manufacture of claim 27 further comprising data that, when accessed, causes the machine to respond to a memory request according to a cache coherence protocol when snooping is enabled.

29. The article of manufacture of claim 27 wherein the data causing the machine to control snooping further comprises data that causes the machine to:
generate a snooping disable condition; and disable snooping the access reference when the snooping disable condition occurs.

30. The article of manufacture of claim 29 wherein the data causing the machine to generate the snooping disable condition comprises data that causes the machine to generate the snooping disable condition when the entry table ID does not match the cycle task ID, when the entry task status is invalid, or when the task cycle terminator is reached.

31. A system comprising:
a processor bus; and
at least first and second processors coupled to the processor bus, the first processor having a task manager and a cache memory, the task manager comprising:
   a task table to store a task entry corresponding to a first task associated with the first processor, the first task being a partitioned program routine having at least an instruction block, and
   a snoop controller coupled to the task table to control snooping an access reference to a cache line in a task block of the cache memory in response to a second task cycle generated by the second processor according to a snoop condition, the second task cycle including a set of cache line accesses required by a second task.

32. The system of claim 31 wherein the task manager further comprising:
   a table updater coupled to the task table to update the task entry based on a first task cycle generated by the first processor, the first task cycle including a set of cache line accesses required by the first task.

33. The system of claim 32 wherein the task entry includes at least one of an entry task status, an entry task identifier (ID), an entry task address, an entry task block size, and an entry task terminator.

34. The system of claim 33 wherein one of the first and second task cycles provides at least one of a cycle task ID, a task command, a cycle task terminator, a memory request, and a cycle task block size.

35. The system of claim 34 wherein the task command includes at least one of an acquire task command, an evict task command, and an invalidate task command.

36. The system of claim 35 wherein the entry task status is one of invalid and valid.

37. The system of claim 36 wherein the snoop controller comprises:
   a comparator to match the entry task ID and the cycle task ID; and
   a snoop enable circuit to enable snooping the access reference when the entry task ID matches the cycle task ID and the entry task status is valid.

38. The system of claim 37 wherein the first processor responds to a memory request according to a cache coherence protocol when snooping is enabled.

39. The system of claim 37 wherein the snoop enable circuit disables snooping the access reference when a snooping disable condition occurs.

40. The system of claim 39 wherein the snooping disable condition occurs when the entry table ID does not match the cycle task ID, when the entry task status is invalid, or when the task cycle terminator is reached.

* * * * *